United States Patent [19]

Iso

[11] Patent Number: 5,737,486

[45] Date of Patent: Apr. 7, 1998

[54] PATTERN RECOGNITION METHOD BY USING REFERENCE PATTERNS EACH OF WHICH IS DEFINED BY PREDICTORS

[75] Inventor: Ken-Ichi Iso, Tokyo, Japan

[73] Assignee: NEC Corporation, Tokyo, Japan

[21] Appl. No.: 434,992

[22] Filed: May 4, 1995

Related U.S. Application Data

[60] Division of Ser. No. 159,306, Nov. 30, 1993, which is a continuation-in-part of Ser. No. 29,951, Mar. 9, 1993, abandoned, which is a continuation of Ser. No. 521,625, May 10, 1990.

[51] Int. Cl.$^6$ ................................ G10L 9/00; G10L 5/06
[52] U.S. Cl. ........................... 395/2.41; 395/23; 395/2.53
[58] Field of Search .......................... 395/2, 2.11, 2.41, 395/2.68, 2.52–2.54, 20, 21, 23

[56] References Cited

PUBLICATIONS

Deller et al., "Discrete–Time Processing of Speech Signals," 1987, pp. 814–847, Prentice Hall, NJ.
Bourland et al., "Merging Multilayer Perceptions and Hidden Markov Models: Some Experiments in Continuous Speech Recognition", Jul. 1989, ISI, pp. 1–18.
Lippmann, "An Introduction to Computing with Neural Nets", IEEE ASSP Magazine, Apr. 1987, pp. 4–22.

*Primary Examiner*—David D. Knepper
*Attorney, Agent, or Firm*—Sughrue, Mion, Zinn, Macpeak & Seas, PLLC

[57] ABSTRACT

A method for training speech sound predictors, which define a reference pattern representative of a reference category, by using training patterns representing speech sound to adjust parameters characterizing each of the predictors. The training patterns may represent a training category identical with the reference category. The training patterns may alternatively represent a training category different from the reference category. The training method includes steps of initializing the parameters; calculating the prediction error between the reference pattern and one of the training patterns at a time; correcting the parameters so as to either decrease the prediction error (according to the first aspect) or increase the prediction error (according to the second aspect), and iterating the second and third steps for all of the training patterns.

2 Claims, 11 Drawing Sheets

PATTERN RECOGNITION METHOD BY USING REFERENCE PATTERNS EACH OF WHICH IS DEFINED BY PREDICTORS

This is a divisional of application Ser. No. 08/159,306 filed Nov. 30, 1993, in turn a continuation-in-part of U.S. application Ser. No. 08/029,951 filed Mar. 9, 1993, now abandoned, which is a continuation of U.S. application Ser. No. 07/521,625 filed May 10, 1990.

BACKGROUND OF THE INVENTION

This invention relates to a pattern recognition method of recognizing an input pattern as a recognized pattern selected from a plurality of reference patterns which represent categories of recognition objects, respectively. The input pattern is represented by a time sequence of input feature vectors and specifically represents speech sound.

In a pattern recognition method, such as a speech recognition method, reference patterns are necessary for pattern recognition. Each reference pattern is defined by a signal model. Various signal models of the type are already known. By way of example, a signal model is described in an article contributed by L. R. Rabiner and B. H. Juang to IEEE ASSP MAGAZINE, January 1986, pages 4 to 16, under the title of "An Introduction to Hidden Markov Models". The signal model according to Rabiner et al is called a hidden Markov model (HMM). The hidden Markov model carries out modeling of the reference pattern on the assumption that the time sequence of the input feature vectors is produced by Markov stochastic process. The hidden Markov model is characterized by a plurality of states and transitions between the states. Each state produces a pattern vector in accordance with a predetermined probability distribution. Each transition is accompanied by a predetermined state transition probability. A distance between the input pattern and the reference pattern is given by a likelihood so that the hidden Markov model generates the time sequence of the input feature vectors.

Inasmuch as the hidden Markov model carries out modeling of the reference pattern on the assumption that the time sequence of the input feature vectors is generated in accordance with the Markov stochastic process, a temporal correlation between the input feature vectors in the hidden Markov model is equivalent to a short temporal correlation between the input feature vectors adjacent to each other. Accordingly, it is difficult for the hidden Markov model to directly model a long temporal correlation between feature vectors such as a speech pattern that are temporally apart from each other. For example, the long temporal correlation is a correlation for an utterance between an utterance speed of former half portion and another one of latter half portion in the utterance.

In addition, the hidden Markov model independently carries out modeling of "a temporal structure among feature vectors" and of "a distribution in a vector space for each feature vector". It is therefore difficult to carry out modeling of the reference pattern in consideration of an interdependence, namely, a spatial and temporal correlation between the temporal structure among the feature vectors and the distribution in the vector space of each feature vector in such as the speech pattern due to utterance.

SUMMARY OF THE INVENTION

It is an object of the present invention to provide a pattern recognition method by using a model of reference pattern, each of which has a high power of expression.

It is another object of the present invention to provide a pattern recognition method of the type described, by using the reference patterns, each taking account of a temporal correlation between feature vectors which are apart from one another by an optional time interval between the feature vectors in a temporal structure.

It is still another object of the present invention to provide a pattern recognition method of the type described, by using the reference patterns each of which takes account of a spatial and temporal correlation between the temporal structure among the feature vectors and a distribution in a vector space for each feature vector.

It is an additional object of the present invention to provide a reference pattern training method which is capable of automatically constructing predictors of a reference pattern from a plurality of training patterns.

A method to which this invention is applicable is for recognizing an input pattern represented by a time sequence of input feature vectors as a recognized pattern selected from a plurality of reference patterns which represent categories of recognition objects, respectively. Each of the reference patterns is defined by a sequence of predictors.

According to this invention, the above-mentioned recognizing method comprises the steps of successively deriving a time sequence of predicted feature vectors and a sequence of new state vectors from the time sequence of the input feature vectors and a sequence of preceding state vectors by using the sequence of the predictors, of calculating a prediction error between the time sequence of the input feature vectors and the time sequence of the predicted feature vectors, and of selecting, as the recognized pattern, one of the reference patterns that minimizes the prediction error.

A method to which this invention is applicable is for training a plurality of predictors defining a reference pattern representative of a reference category by using a plurality of training patterns to adjust a plurality of parameters characterizing each of the predictors, each of the training patterns representing speech sound.

According to a first aspect of this invention, each of the training patterns represents a training category identical with the reference category. The above-mentioned training method comprises the steps of a) initializing the parameters, of b) calculating a prediction error between the reference pattern and one of the training patterns at a time, of c) correcting the parameters so as to decrease the prediction error, and of d) iterating steps b) and c) for all of the training patterns.

According to a second aspect of this invention, each of the training patterns represents a training category different from the reference category. The afore-mentioned training method comprises the steps of a) initializing the parameters, b) calculating a prediction error between the reference pattern and one of the training patterns at a time, c) correcting the parameters so as to increase the prediction error, and d) iterating steps b) and c) for all of the training patterns.

DESCRIPTION OF THE PREFERRED EMBODIMENT

Principles of the Invention

Description will first be directed to principles of this invention to facilitate an understanding of this invention. In a pattern recognition method and a reference pattern training method according to this invention, a reference pattern represents a category of a recognition object and is defined by a plurality of sequentially arranged state models. An input pattern is represented by a time sequence of input feature vectors. Each state model is supplied with a specific one of the input feature vectors and a preceding state vector in the manner which will become clear as the description proceeds. Responsive to the specific input feature vector and the preceding state vector, the state model processes the specific input feature vector and the preceding state vector into a predicted feature vector and a new state vector.

More specifically, attention will be directed to a t-th or current time instant t. Up to the current time instant, a plurality of input feature vectors are supplied to the state model which acts as a predictor. From these input feature vectors, the predictor predicts, as the predicted feature vector, a feature vector to be produced at a next or a (t+1)-th time instant (t+1). In order to carry out better prediction, an optimal prediction is carried out by adaptively changing a plurality of predicting units so as to minimize a prediction error which is equal to a difference between the time sequence of the input feature vectors and a time sequence of predicted feature vectors produced by predictors by using, for example, dynamic programming which is known in the art. On recognizing, the prediction error is used as a distance between the time sequence of the input feature vectors and the time sequence of the predicted feature vectors. Training of the reference pattern is carried out by using a gradient descent method which uses the prediction error as a cost function.

Figure 1:
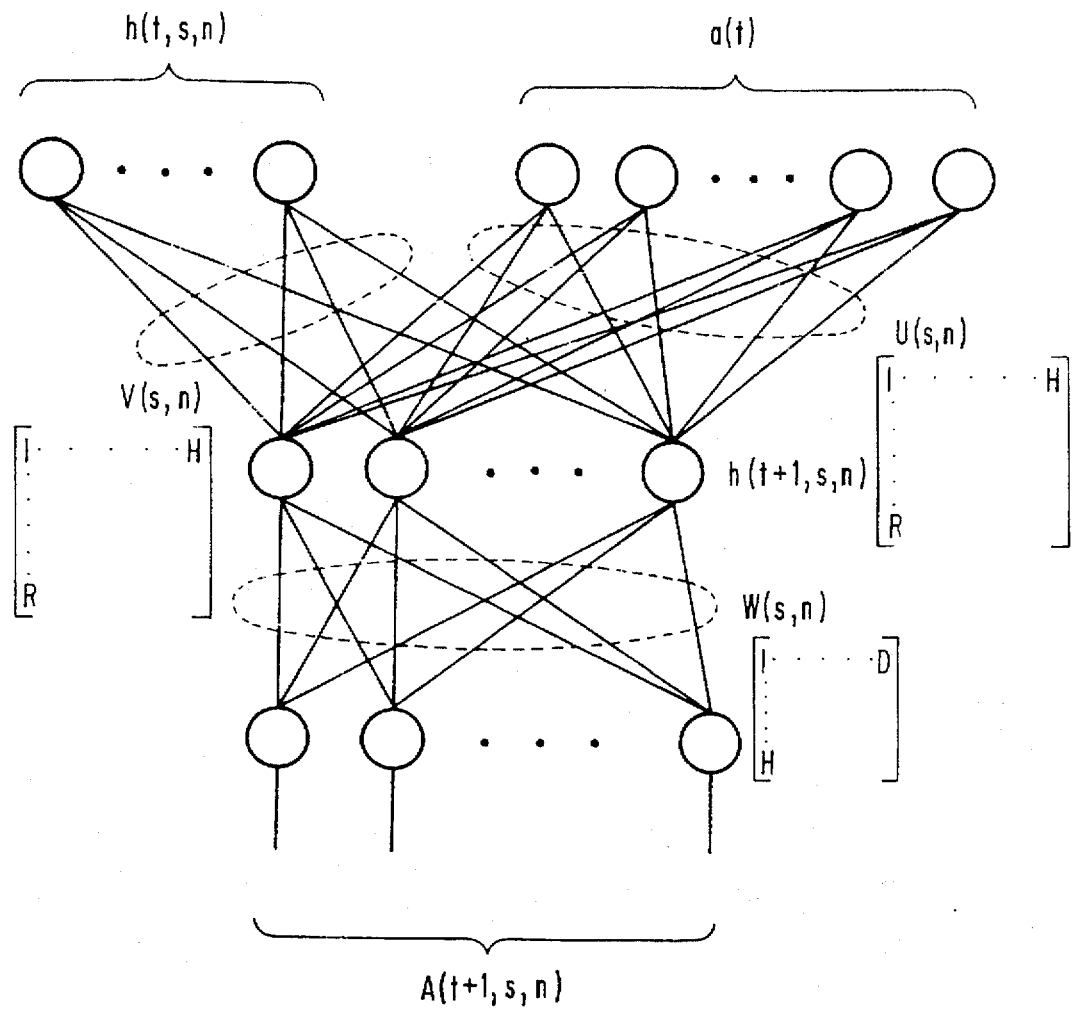
FIG. 1 shows a recursive neural network model for use in a pattern recognition method and a reference pattern training method according to this invention.

Referring to FIG. 1, description will be made as regards the pattern recognition method and the reference pattern training method according to this invention. Herein, speech recognition will be exemplified although this invention is applicable also to other pattern recognition provided that a pattern is represented by a time sequence of vectors.

Attention will be directed to the current time instant t. Up to the current time instant t, the state model or the predictor is supplied with the input feature vectors of an input speech that are depicted at a(1), a(2), ..., and a(t). From these input feature vectors a(1) to a(t), the state model (the predictor) predicts the predicted feature vector at the next time instant (t+1). The predicted feature vector is depicted at A(t+1). The predictor is supplied with the input feature vectors a(1) to a(t) which are produced in the past in the manner which will presently be described. One of such a state model is a state model like a finite impulse response (FIR) filter which is supplied with the input feature vectors having a fixed finite length that are extracted from the input speech in the past. Another state model is a state model like an infinite impulse response (IIR) filter which is supplied with the input feature vectors equivalently having an infinite length in the past by means of feedback. A specific case will be taken into consideration where feedback has, in the state model like the IIR filter, parameters which are all equal to zero. In this case, the state model like the IIR filter is regarded as the state model like the FIR filter. Therefore, description will hereunder be made as regards the state model like the IIR filter.

It will be assumed as follows. The input speech is represented by a time sequence of first through T-th input feature vectors a(1) to a(T) placed at first through T-th time instants 1 to T where T represents a first predetermined natural number which is not less than two. A recognized pattern is selected from first through S-th reference patterns which represent first through S-th categories, namely, words w(1) to w(S) where S represents a second predetermined natural number which is not less than two. An s-th reference pattern is defined by first through Ns-th state models s(1) to s(Ns) where Ns represents a third predetermined natural number which is not greater than the first predetermined number and which is not less than two and s is variable between 1 and S, both inclusive. The third predetermined natural number Ns depends on the s-th reference pattern.

Under the circumstances, an n-th state model defining the s-th reference pattern is characterized as follows:

$$h(t+1, s, n) = f[a(t), h(t, s, n), X],  \quad (1)$$

$$A(t+1, s, n) = g[a(t), h(t+1, s, n), Y],  \quad (2)$$

where n is variable between 1 and Ns, both inclusive, t is variable between 1 and (T−1), both inclusive, a(t) is a t-th input feature vector at the t-th time instant t, h(t, s, n) is the preceding state vector produced by the n-th state model for an s-th word at the t-th time instant t, X represents a plurality of primary parameters, Y represents a plurality of secondary parameters, h(t+1, s, n) is the new state vector produced by the n-th state model for the s-th word at the (t+1)-th time instant A(t+1, s, n) is the predicted feature vector produced by the n-th state model for the s-th word at the (t+1)-th time instant (t+1), a function notation f represents a first nonlinear vector function characterized by the primary parameters X, and a function notation g represents a second nonlinear vector function characterized by the secondary parameters Y.

As apparent from the above-mentioned equations (1) and (2), the new state vector h(t+1, s, n) and the predicted feature vector A(t+1, s, n) are calculated by using only the t-th input feature vector a(t). However, the new state vector h(t+1, s, n) and the predicted feature vector A(t+1, s, n) may be calculated by using previous input feature vectors, for example, a (t−2)-th through the t-th input feature vectors a(t−2) to a(t).

As shown in FIG. 1, a recursive neural network model may be used as each state model, which is an n-th state model and will later be illustrated. The recursive neural network model comprises an input layer, a hidden or middle layer, and an output layer. The input layer comprises a plurality of primary input units and a plurality of secondary input units. The hidden layer comprises a plurality of hidden units. The output layer comprises a plurality of output units. The primary input units are supplied with the t-th input feature vector a(t). The secondary input units are supplied with the preceding state vector h(t, s, n). The hidden units produce the new state vector h(t+1, s, n). The output units produce the predicted feature vector A(t+1, s, n). In this event, the recursive neural network model is characterized as follows:

$$h(t+1, s, n) = f[U(s, n)a(t) + V(s, n)h(t, s, n)], \quad (3)$$

$$A(t+1, s, n) = g[W(s, n)h(t+1, s, n)], \quad (4)$$

where U(s, n) is a first coefficient matrix for connecting between the primary input units and the hidden units, V(s, n) is a second coefficient matrix for connecting between the secondary input units and the hidden units, and W(s, n) is a third coefficient matrix for connecting between the hidden units and the output units. A combination of the first and the second coefficient matrices U(s, n) and V(s, n) corresponds to the primary parameters X given by the above-mentioned equation (1). The third coefficient matrix W(s, n) corresponds to the secondary parameter Y given by the above-mentioned equation (2). In the equations (3) and (4), each of the first and the second nonlinear vector functions f and g gives a vector obtained by applying a sigmoid function to each component of an argument vector.

As apparent from the equation (3), the feedback is implemented by supplying the preceding state vector h(t, s, n) to the secondary input units of the recursive neural network model. According to the feedback using the preceding state vector h(t, s, n), the predicted feature vector A(t+1, s, n) reflects the input feature vector having the infinite length up to the t-th time instant t.

For simplification purposes, the description will be made as regards the pattern recognition method using as the state model the recursive neural network model shown in FIG. 1 although this invention is well applicable to the pattern recognition method using the state model represented by the above-mentioned equations (1) and (2).

Figure 2:
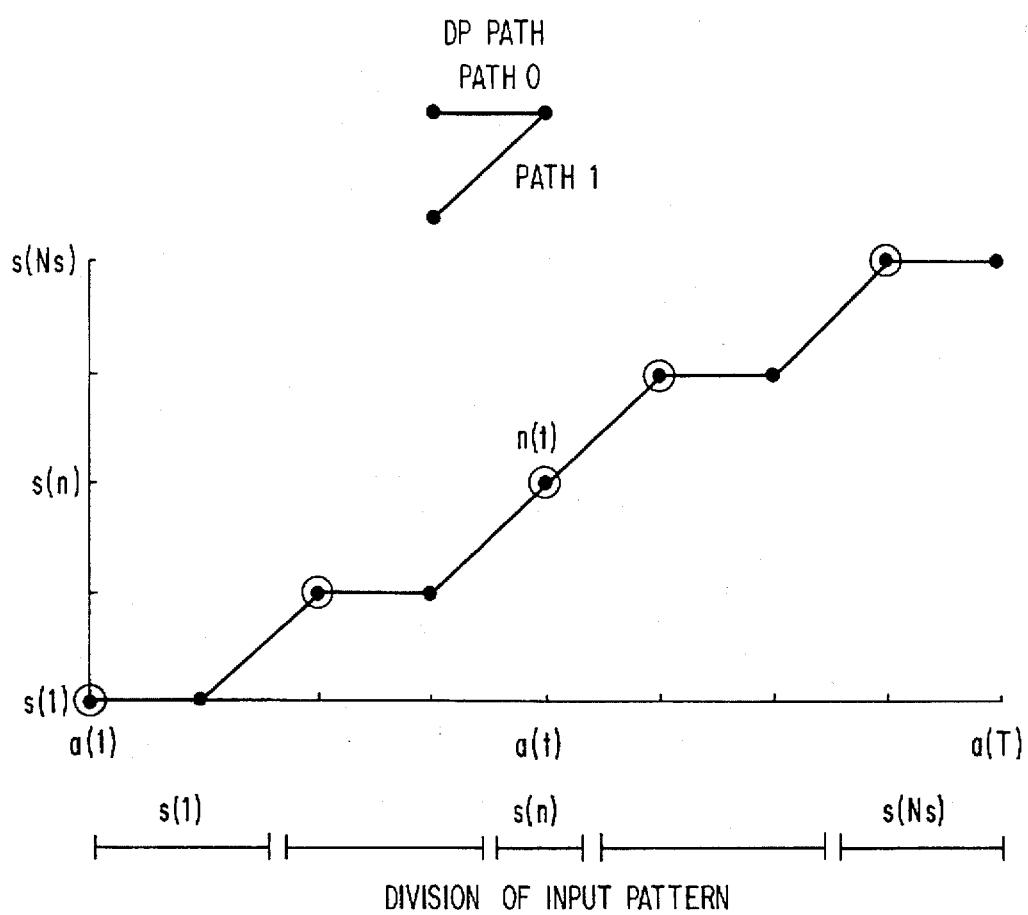
FIG. 2 shows a plane which visualizes a dynamic programming algorithm for use in the pattern recognition method and the reference pattern training method according to this invention.

Turning to FIG. 2, the description will proceed to a recognition algorithm for recognizing the input speech pattern by using the first through the S-th reference patterns. It will be assumed that the s-th reference pattern is defined by a set of the first through the Ns-th state models s(1) to s(Ns). The n-th state model s(n) defining the s-th reference pattern is represented by the above-mentioned equations (3) and (4). In the manner known in the art, the input speech pattern is represented by the time sequence of the first through the T-th input feature vectors a(1) to a(T). A distance D(s) will be used as a measure of similarity or likelihood between the input speech and the s-th reference pattern and is defined under the circumstances as follows:

$$D(s) = \min_{n(t)} \sum_{t=1}^{T} \|A(t,s,n(t)) - a(t)\|^2, \quad (5)$$

where a notation $\| \ \|$ represents a Euclidian norm of a vector and A(t, s, n(t)) represents the feature vector predicted by a n(t)-th state model for the s-th word. Here, n(t) determines which of the state models is assigned to the prediction at the t-th time instant t and is a monotone non-decreasing function which must satisfy the following constraints:

$$n(1) = 1, \quad (6)$$
$$n(T) = Ns, \quad (7)$$
and
$$n(t) = n(t-1) \text{ or } n(t-1) + 1. \quad (8)$$

Under these constraints, minimization of the distance D(s) can be accomplished by the use of a dynamic programming (DP) algorithm known in the art as shown in FIG. 2.

FIG. 2 illustrates a plane which visualizes the DP algorithm, where the abscissa and the ordinate represent the time sequence of the first through the T-th input feature vectors a(1) to a(T) of the input speech pattern and the sequence of the first through the Ns-th state models s(1) to s(Ns) for the s-th word, respectively. Notations n(1) to n(T) represent lattice points on the plane along DP paths, each of which is selected either along path 0 or path 1.

Attention must be necessary to process boundary points where transitions from one to another occur along the path 1 in the state models s(1) to s(Ns). Each of the boundary point is a lattice point represented by an encircled dot in FIG. 2. Although the state models s(1) to s(Ns) are predictors which are independent of one another, each state model is supplied with the preceding state vector. It will be assumed that a transition from the (n−1)-th state model s(n−1) to the n-th state model s(n) occurs along the path 1 at the t-th time instant t. In this case, it must be predetermined that which of two new state vectors produced by the (n−1)-th state model s(n−1) and the n-th state model s(n) is used as the preceding state vector supplied to the n-th state model s(n).

In the example being illustrated, all of the state models produce the new state vectors which have a plurality of components equal in number to one another. At the boundary point, the n-th state model s(n) is supplied with, as the preceding state vector, the new state vector produced by the (n−1)-th state model s(n−1).

Attention will be directed to a basic recognition algorithm which includes processing of the boundary points. The basic recognition algorithm is divided into initialization process, iteration process, and result recognition process. The initialization process initializes initial conditions (t=1) given by:

$$H(1,s,n) = f[U(s,n)a(1)], \quad (A1)$$
$$A(1,s,n) = g[W(s,n)H(1,s,n)], \quad (A2)$$
and
$$j(s,1,n) = \|A(1,s,n) - a(1)\|^2, \quad (A3)$$

where j(s, 1, n) represents and accumulated distance at start lattice points, namely, (t, n)=(1, n). The predicted feature vector A(1, s, n) is predicted from the first input feature vector a(1). This is because no information is present before the first time instant 1.

The iteration process is represented by a set of seven recurrence formulas (1<t<T, p=(0, 1) ) as follows:

$$h(t,s,n,p) = f[U(s,n)a(t-1) + V(s,n)(9t-1,s,n-p)], \quad (B1)$$
$$A(t,s,n,p) = g[W(s,n)h(t,s,n,p)], \quad (B2)$$
$$d(t,s,n,p) = \|A(t,s,n,p) - a(t)\|^2, \quad (B3)$$
$$j(t,s,n,p) = [d(t,s,n,p) + j(t,s,n-p)], \quad (B4)$$
$$j(t,s,n) = \min_{p=(0,1)}[j(t,s,n,p)], \quad (B5)$$
$$P = \text{argmin}_p[j(t,s,n,p)], \quad (B6)$$
and
$$H(t,s,n) = h(t,s,n,P), \quad (B7)$$

where p is a variable which represents the DP path. The path 0 is represented by p=0 while the path 1 is represented by p=1. In each lattice point (t, n), the iteration process calculates the new state vector, namely, outputs of the hidden units h(t, s, n, p) in correspondence to the path 0 and the path 1. Subsequently, the iteration process calculates a distance d(t, s, n, p) between the input feature vector a(t) and the predicted feature vector A(t, s, n, p). Finally, the iteration process calculates an optimum DP path P and the accumulated distance j(s, t, n). The state vector h(t, s, n, P) is used in predicting the predicted feature vector on the optimum DP path and is stored as the state vector H(t, s, n) in a memory (not shown) for the lattice point (t, n).

The result recognition process calculates a recognition result σ as follows:

$$D(s)=j(s, T, Ns),\qquad(C1)$$

and $$\sigma=argmin_s[D(s)]\qquad(C2)$$

A final accumulated distance j(s, T, Ns) is equal to the distance D(s) between the input speech and the s-th reference pattern representing the s-th word w(s). The recognition result σ represents one of the first through the S-th words w(1) to w(S) that minimizes the distance D(s).

As described above, the pattern recognition method according to this invention recognizes the input speech pattern by using the reference patterns, each defined by the state models which are not directly dependent on one another. It is therefore possible to carry out connected word recognition or continuous speech recognition by using a concatenated reference pattern which is a concatenation of selected ones of the reference patterns. In this case, the accumulated distance is calculated in synchronism with the time sequence of the input feature vectors and increases step by step with the lapse of the time. Accordingly, it is possible to efficiently carry out the connected word recognition by using the clockwise DP-matching algorithm which is known in the art.

The description will be directed to a training algorithm for training the state models defining the s-th reference pattern representative of the s-th word by using first through Ms-th training speech patterns where Ms represents a fourth predetermined natural number which is not less than two. It will be assumed that each of the first through the Ms-th training speech patterns represents the s-th word.

The parameters of the state models are preliminarily initialized by using random numbers. when the recursive neural network model is used as the state model, the parameters of the state model, four in number, are the matrices U(s, n), V(s, n), and W(s, n) and a threshold value assigned to the sigmoid function. Training of the s-th reference pattern is carried out to repeatedly correct the parameters K times by using the gradient descent method, where K represents a fifth predetermined natural number which is not less than two.

Attention will be directed to k-times repetition of the correction where k is a variable between 1 and K, both inclusive. At k-times repetition of the correction, an average prediction error D(k, s) is defined as follows:

$$D(k,s) = (1/Ms) \sum_{m=1}^{Ms} D(k,s,m),\qquad(9)$$

and $$D(k,s,m) = \min_{n(t)} \sum_{t=1}^{Tm} \|A(t,s,n(t),m,k) - a(t,m)\|^2,\qquad(10)$$

where m is a variable between 1 and Ms, both inclusive, A(t, s, n(t), m, k) represents the predicted feature vector produced by the n-th state model s(n) which is supplied with an m-th training speech pattern represented by first through Tm-th training feature vectors a(1, m) to a(Tm, m), where Tm represents a sixth predetermined natural number which is not less than two. In order to decrease the average prediction error D(k, s), the gradient descent method is carried out on the optimum DP path. More particularly, the parameters X of the n(t)-th state model for the s-th word w(s) is corrected at a correction amount δX by using the gradient descent method so as to decrease the prediction error between the predicted feature vector A(t, s, n(t), m, k) and the t-th training feature vector a(t, m). The correction amount δX of the parameters X is given by:

$$\delta X = -\epsilon \sum_{m=1}^{Ms} \left( \frac{\delta D(k,s,m)}{\delta X} \right),\qquad(11)$$

wherein ε is a small positive real number. When the recursive neural network model is used as the state model, the gradient descent method is identical with back-propagation (BP) technique. After the correction of the parameters X by the correction amount δX, the average prediction error D(k, s) becomes a corrected average prediction error Dbp(k, s). By the nature of this gradient descent method, the corrected average prediction error Dbp(k, s) is not greater than the average prediction error D(k, s) at k-times repetition of the correction, that is:

$$D(k, s) \geq Dbp(k, s).\qquad(12)$$

The DP path n(t) at k-times repetition of the correction is not identical with the optimum DP path because the parameters X is corrected. At (k+1)-times repetition of the correction, an average prediction error D(k+1, s) is calculated on the optimum DP path. By optimization of the dynamic programming algorithm, the average prediction error D(k+1, s) at (k+1)-times repetition of the correction is not greater than the corrected average prediction error Dbp(k, s). That is:

$$Dbp(k, s) \geq D(k+1, s).\qquad(13)$$

Combining the equations (12) and (13), it is understood that an average prediction error decreases without fail by iterative training. That is:

$$D(k+1, s) \leq D(k, s).\qquad(14)$$

As mentioned before, optimization can be made by the iterative training by using a combination of the dynamic programming algorithm and the back propagation technique.

In order to decrease misjudgment of the recognition, another training algorithm is for training the state models defining the s-th reference pattern representative of the s-th word by using a plurality of another training speech pattern, each representative of another word that is different from the s-th word. Such a training algorithm is referred to as a discriminative training algorithm. The discriminative training algorithm is similar to the above-mentioned training algorithm except that another correction amount for the untraining algorithm has a sign inverted relative to that of the correction amount δX given by the equation (11). According to the untraining algorithm, it is possible to construct the state models of the s-th reference pattern so as to increase a prediction error between the s-th reference pattern and each of the training speech patterns that represents the other word different from the s-th word.

As mentioned above, each of the reference patterns is defined by the state models, each of which is supplied with the preceding state vector as a feedback signal. Accordingly, it is possible to carry out modeling of a temporal correlation between the feature vectors which are spaced apart from one another by an optional time interval between the feature vectors in a temporal structure. In addition, each of the state models is characterized by the nonlinear vector function supplied with the preceding state vector and the input feature vector. As a result, it is possible to make the state model represent a spatial and temporal correlation between the temporal structure among the feature vectors and a distribution in a vector space for each feature vector. Furthermore, it is possible to automatically construct the state models of each reference pattern from a plurality of training patterns according to the reference pattern training method based on the above-mentioned gradient descent method.

Embodiment

Figure 3:
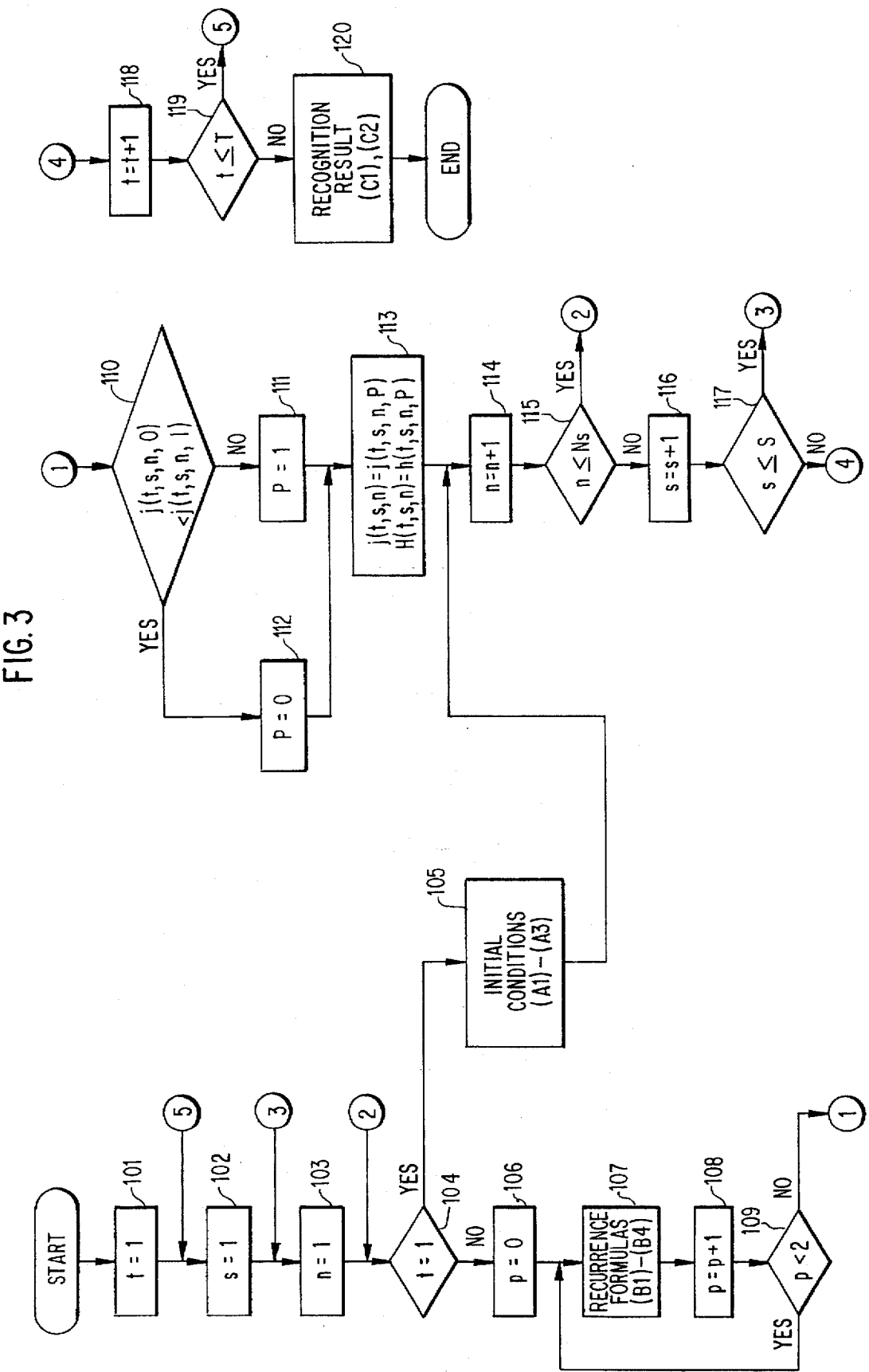
FIG. 3 shows a flow chart for use in describing operation of the pattern recognition method according to this invention.

Referring to FIG. 3, the description will proceed to operation of the pattern recognition method according to this invention.

At first, all of the variables t, s, and n are initialized to be equal to one at steps 101, 102, and 103. The step 103 is followed by a step 104 for detecting a starting point of the input pattern, namely, whether or not the variable t is equal to one. When the variable t is equal to one, the step 104 proceeds to a step 105 which will presently be described. Otherwise, the step 104 is succeeded by a step 106 which will later be described.

The step 105 makes calculations of the above-described equations (A1) to (A3) which represent the initial conditions of the basic recognition algorithm.

The step 106 renders the variable p to zero. The step 106 is followed by a step 107. The step 107 makes calculations of the equations (B1) to (B4) which represent the recurrence formulas of the basic recognition algorithm. The step 107 proceeds to a step 108 at which one is added to the variable p. The step 108 is succeeded by a step 109 for detecting whether or not the variable p is less than two. When the variable p is less than two, the step 109 turns back to the step 107. Otherwise, the step 109 is followed by a step 110.

The step 110 is for comparing the accumulated distance j(t, s, n, 0) with the accumulated distance j(t, s, n, 1). When the accumulated distance j(t, s, n, 0) is not less than the accumulated distance j(t, s, n, 1), the step 110 proceeds to a step 111 which selects the path 1 on the optimum DP path P. Otherwise, the step 110 is succeeded by a step 112, which selects the path 0 on the optimum DP path P. Both of the steps 111 and 112 are followed by a step 113.

The step 113 sets up the accumulated distance j(t, s, n) and the new state vector H(t, s, n) on the optimum DP path P. In other words, the step 113 is for calculating the equations (B5) and (B7) which represent the recurrence formulas of the basic recognition algorithm. The step 113 proceeds to a step 114 which follows the step 105.

At the step 114, one is added to the variable n. The step 114 is succeeded by a step 115 for detecting whether or not the variable n is not greater than the third predetermined natural number Ns. When the variable n is not greater than the third predetermined natural number Ns, the step 115 turns back to the step 104. Otherwise, the step 115 is followed by a step 116.

At the step 116, one is added to the variable s. The step 116 is succeeded by a step 117 for detecting whether or not the variable s is not greater than the second predetermined natural number S. When the variable s is not greater than the second predetermined natural number S, the step 117 turns back to the step 103. Otherwise, the step 117 is followed by a step 118.

At the step 118, one is added to the variable t. The step 118 is succeeded by a step 119 for detecting whether or not the variable t is not greater than the first predetermined natural number T. When the variable t is not greater than the first predetermined natural number T, the step 119 turns back to the step 102. Otherwise, the step 119 is followed by a step 120.

At the step 120, the recognition result is selected from the first through the S-th words w(1) to w(S) in accordance with equations (C1) to (C2) which represent the result recognition process of the basic recognition algorithm.

As apparent from a flow chart shown in FIG. 3, it is possible to carry out processing in the step 101 through the step 119 for each input feature vector or within one frame. Therefore, it is possible to carry out processing in synchronism with the frame along a time axis of the input pattern. Taking advantage of this, it is possible to theoretically recognize the input pattern during a processing time interval between the starting point of the input pattern and a point which is one frame spaced from an end point of the input pattern. As a result, the pattern recognition method according to this invention can recognize the input pattern in real time.

In the example being illustrated, the description has been made as regards an isolated word recognition. In order to carry out the connected word recognition, the concatenation of selected reference patterns are used as mentioned before. The connected word recognition is carried out in the similar manner which is described above as the isolated word recognition. The recognition result represents one of the concatenation of selected reference patterns that minimizes a prediction error.

Figure 4:
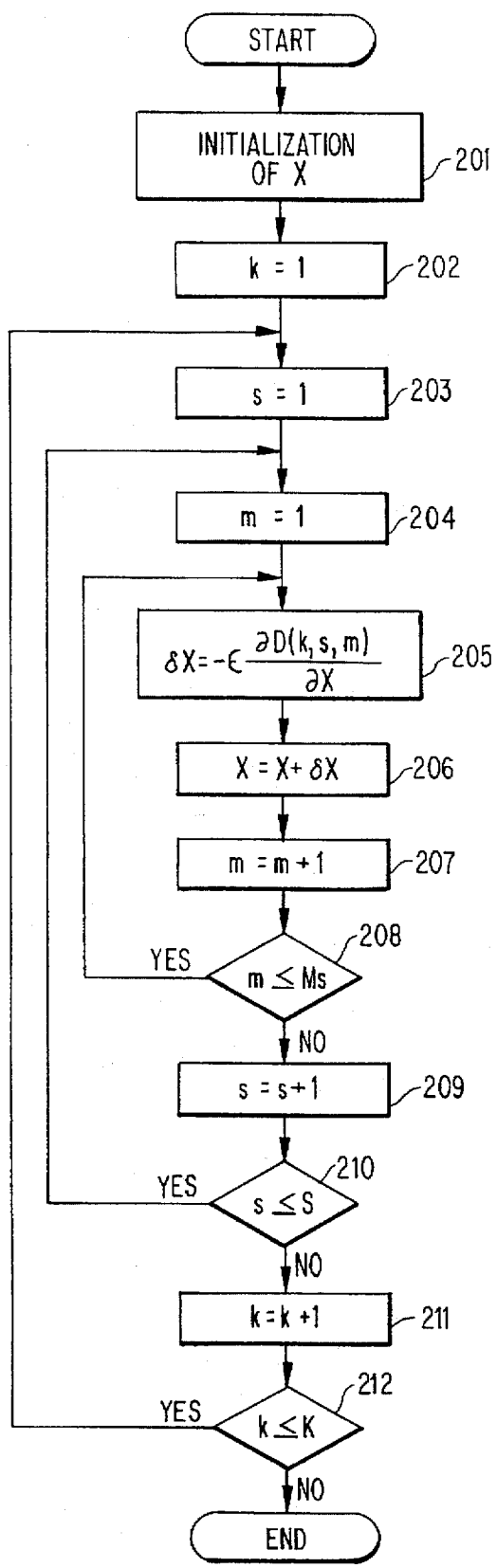
FIG. 4 shows a flow chart for use in describing operation of the reference pattern training method according to this invention.

Referring to FIG. 4, the description will proceed to operation of the reference pattern training method according to this invention.

At first, at step 201 initializes the parameters X of the state models. Subsequently, all of the variables k, s, and m are initialized to one at steps 202, 203, and 204. The step 204 is followed by a step 205 for calculating the correction amount δX by using the gradient descent method so as to decrease the prediction error D(k, s, m) for the m-th training speech pattern representing the s-th word w(s) at the k-times repetition of the correction. The step 205 proceeds to a step 206 which corrects the parameters X by the correction amount δX. The step 206 is succeeded by a step 207.

At the step 207, one is added to the variable m. The step 207 is followed by a step 208 for detecting whether or not the variable m is not greater than the fourth predetermined natural number Ms. When the variable m is not greater than the fourth predetermined natural number Ms, the step 208 turns back to the step 205. Otherwise, the step 208 proceeds to a step 209.

At the step 209, one is added to the variable s. The step 209 is followed by a step 210 for detecting whether or not the variable s is not greater than the second predetermined natural number S. When the variable s is not greater than the second predetermined natural number S, the step 210 turns back to the step 204. Otherwise, the step 210 proceeds to a step 211.

At the step 211, one is added to the variable k. The step 211 is followed by a step 212 for detecting whether or not the variable k is not greater than the fifth predetermined natural number K. When the variable k is not greater than the fifth predetermined natural number K, the step 212 turns back to the step 203. Otherwise, processing of the training comes to an end.

In order to carry out the untraining of the reference pattern, the correction amount δX (the step 205 in FIG. 4) should be given an inverted sign.

Figure 5:
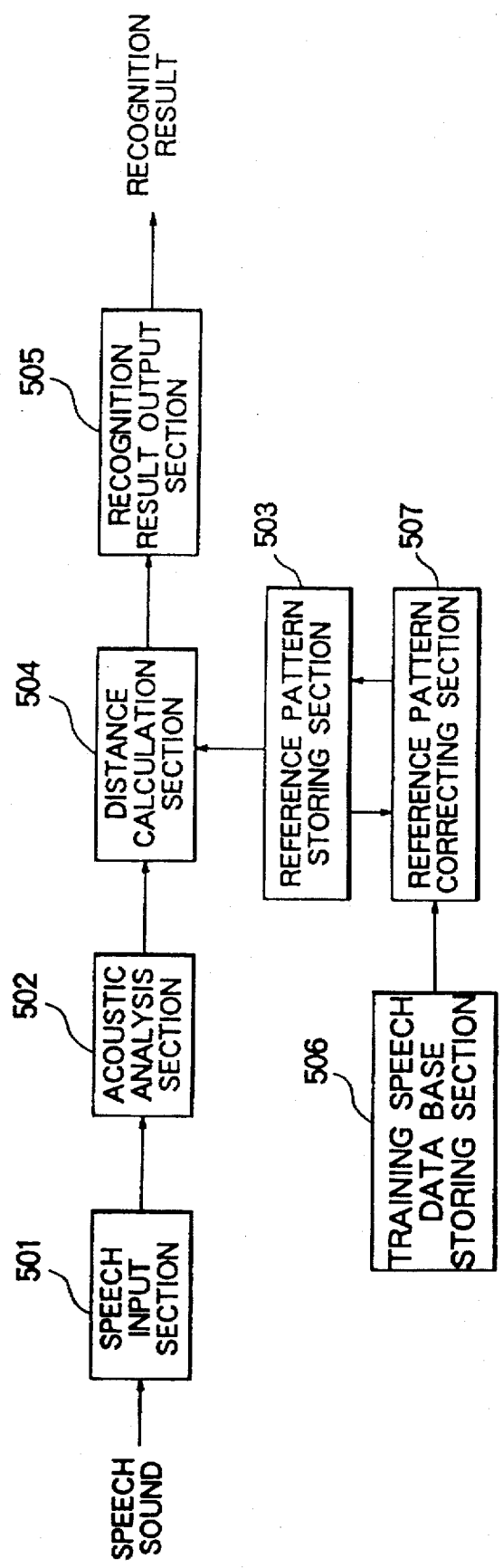
FIG. 5 shows a block diagram of a speech recognition device and a reference pattern training device according to this invention.

Referring to FIG. 5, the description will proceed to operation of a speech recognition device according to this invention.

The speech recognition device comprises a speech input section 501. The speech input section 501 comprises a microphone (not shown) for converting a speech sound uttered by a user into a speech signal, an amplifier (not shown) for amplifying said speech signal to produce an amplified speech signal, and an analog-to digital converter (not shown) for converting the amplified speech signal into a digital speech signal indicative of speech waveform. The speech input section 501 digitizes the speech sound to produce the digital speech signal. The digital speech signal is supplied to an acoustic analysis section 502.

The acoustic analysis section 502 carries out a spectral analysis on the digital speech signal by using a fast Fourier transform (FFT) or the like to produce a time sequence of input feature vectors. The input feature vectors are, for example, feature vectors of D dimensions for a predetermined analysis time interval which is, for example, equal to ten milliseconds. The spectral analysis method may be a linear prediction coding (LPC) method, cepstrum method, or the like instead of an FFT spectral analysis method. Inasmuch as such spectral analysis methods are well known in the art, a more detailed description thereof will be omitted.

A reference pattern storing section 503 stores parameters of reference patterns which represent categories of recognition objects. It will be assumed that the speech recognition device carries out recognition on numbers between zero and nine as the categories. Under the circumstances, the reference pattern storing section 503 stores the parameters of the reference patterns which represent the numbers between zero and nine. The reference pattern of each category is defined by a sequence of predictors. It will also be assumed that the predictors are equal in number to N for the reference pattern of each number in a case where the speech recognition device carries out recognition on numbers between zero and nine as the categories, where N represents a predetermined number which is not less than two. In this event, the total number of the predictors is ten times of N and the reference pattern storing section 503 actually stores, as the parameters of the reference patterns, parameters of the predictors. When the recursive neural network shown in FIG. 1 is used as the predictor, the parameters correspond to the first coefficient matrix U(s, n) for connecting between the primary input units and the hidden units, the second coefficient matrix V(s, n) for connecting between the secondary input units and the hidden units, and the third coefficient matrix W(s, n) for connecting between the hidden units and the output units, where U(s, n) represents a matrix with D rows and H columns, V(s, n) represents a matrix with R rows and H columns, W(s, n) represents H rows and D columns, and D, R, and H have dimensions of the feature vector, dimensions of the state vector, and the number of the hidden units, respectively.

A distance calculation section 504 is supplied with the time sequence of the feature vectors from the acoustic analysis section 502 and is connected to the reference pattern storing section 503. The distance calculation section 504 calculates a distance between the time sequence of the feature vectors and the reference pattern of each category. The distance is supplied to a recognition result output section 505. The distance between the time sequence of the feature vectors representing an input speech and an s-th reference pattern is identical to the distance D(s) which is defined by the above-mentioned Equation (5). A calculation method for the distance D(s) is given by the steps 101 to 119 of the flow chart shown in FIG. 3.

Figure 6:
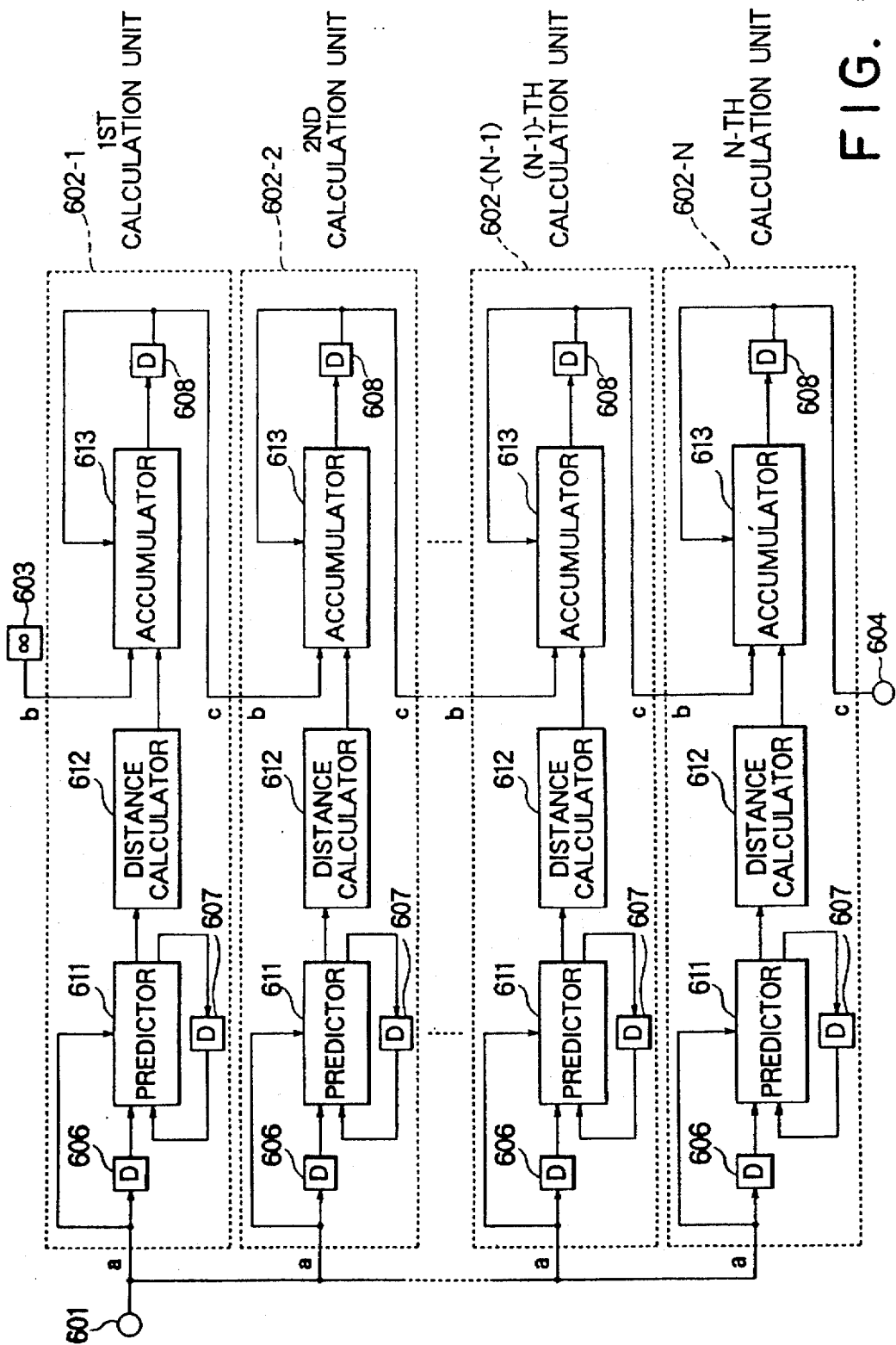
FIG. 6 shows a block diagram of a calculation device in a distance calculation section for use in the speech recognition device illustrated in FIG. 5.

Turning to FIG. 6, the description will proceed to a calculation device for realizing the steps 101 to 119. FIG. 6 shows only one calculation device for the s-th reference pattern. Accordingly, it is necessary to prepare such calculation devices equal in number to the words (the reference patterns). In FIG. 6, an input terminal 601 receives the D-dimensional t-th input feature vector a(t) from the acoustic analysis section 502 at every predetermined analysis time interval. The calculation device comprises first through N-th calculation units 602-1, 602-2, ..., 602-(N−1), and 602-N, where N represents a predetermined positive integer which is not less than two. Each of the first through the N-th calculation units 602-1 to 602-N carries out processing on the input feature vectors in synchronism with the analysis time interval. Each calculation unit carries out input/output from/to external units at three points, namely, a, b, and c shown in FIG. 6. The input a receives the feature vectors from the input terminal 601. The input b of an n-th calculation unit 602-n receives the output c of an (n−1) th calculation unit 602-(n−1), where n represents a variable between two and N, both inclusive. For example, the input b of the second calculation unit 602-2 is connected to the output c of the first calculation unit 602-1. The input b of the N-th calculation unit 602-N is connected to the output c of the (N−1)-th calculation unit 602-(N−1). The input b of the first calculation unit 602-1 is connected to a maximum value producer 603. The maximum value producer 603 always produces a maximum value at each time instant. The output c of the N-th calculation unit 602-N is connected to an output terminal 604. As apparent from the above description, processing of the first through the N-th calculation units 602-1 to 602-N is completely carried out in parallel.

The description will proceed to processing in each calculation unit. Each calculation unit comprises first through third delay elements 606, 607, and 608. Each delay element holds an input signal thereof as a held signal at a current time instant t and produces the held signal as a delayed signal at the next time instant (t+1). Each calculation unit comprises a predictor 611, a distance calculator 612, and an accumulator 613. The predictor 611 is supplied with the input feature vector via the first delay element 606 and with the state vector via the second delay element 607. The predictor 611 performs the calculation of the above-mentioned equations (B1) and (B2) to produce the predicted feature vector and the new state vector. The distance calculator 612 is supplied with the input feature vector and the predicted feature vector. The distance calculator 612 calculates a square distance between the input feature vector and the predicted feature vector in accordance with the above-mentioned equation (B3) to produce the square distance. The accumulator 613 is supplied with an input value from the input b, with a feedback value from the third delay element 608, and with the square distance from the distance calculator 612. The accumulator 613 compares the input value and the feedback value to produce a smaller value between the input value and the feedback value and adds the square distance to the smaller value to produce an accumulated distance. The accumulated distance is supplied to the third delay element 608. Processing in the accumulator 613 corresponds to processing of the above-mentioned equations (B4) to (B6). In order to simplify structure of the calculation device, the illustrated calculation device does not carry out processing for the variable p. That is, it is assumed that the variable p is always equal to zero.

Turning back to FIG. 5, the recognition result output section 505 selects a minimum one among the distances (the prediction error) to produce, as the recognition result, a category name that has the minimum distance. That is, the recognition result output section 505 performs the calculation involving the above-mentioned equations (C1) and (C2).

The description will proceed to describing training operation processing for determining the parameters representing the reference patterns. A training speech data base storing section 506 stores training speech data of all categories to be recognition objects. Stored training speech data are time sequences of feature vectors into which the speech sound has already been converted by the acoustic analysis section 502. A reference pattern correcting section 507 calculates, by using the training speech data stored in the training speech data base storing section 506, the correction amount for the parameters of the reference pattern of each category that are read out of the reference pattern storing section 503 and corrects the parameters of the reference pattern by the correction amount. A processing process for the reference pattern correcting section 507 is shown in FIG. 4. In FIG. 4, all of the parameters of predictors are initialized by random numbers by the step 201.

Figure 7:
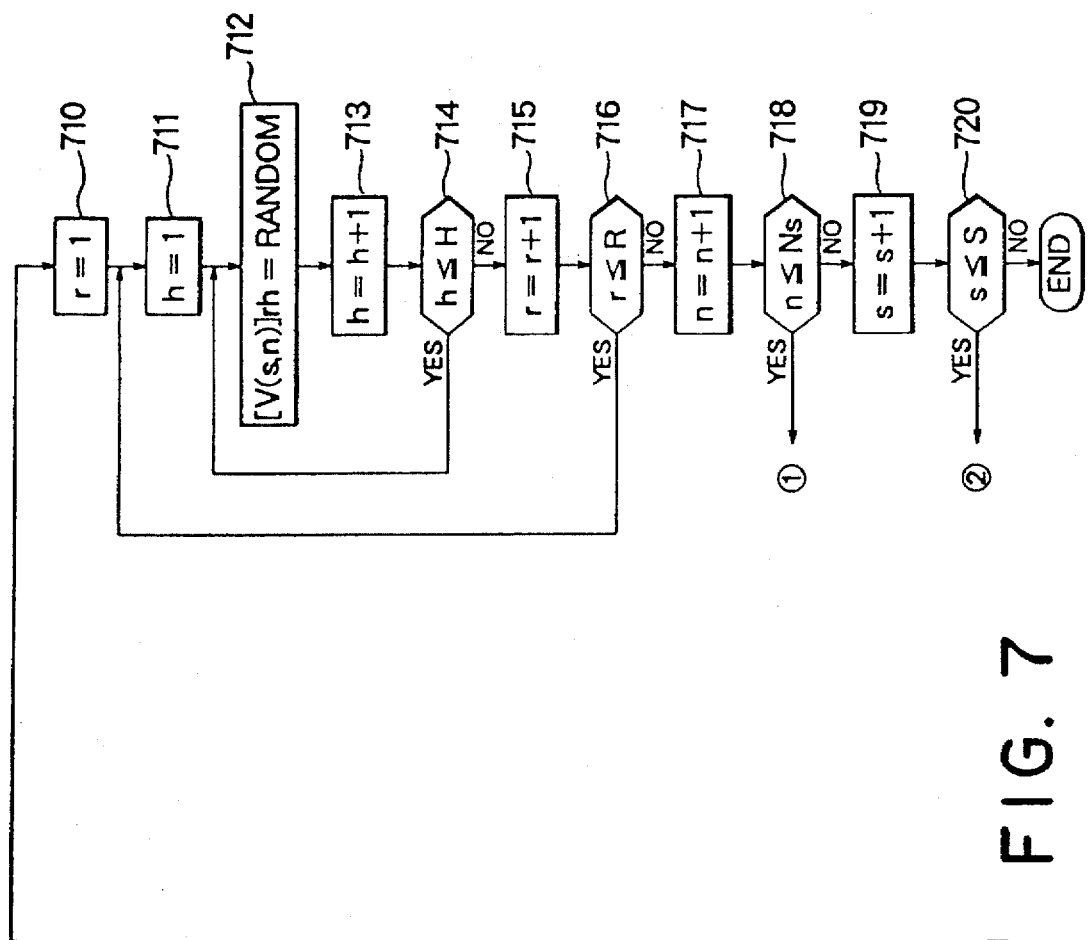
FIG. 7 shows a flow chart for use in describing the operation of an initialization process in a step illustrated in FIG. 4.
Figure 7:
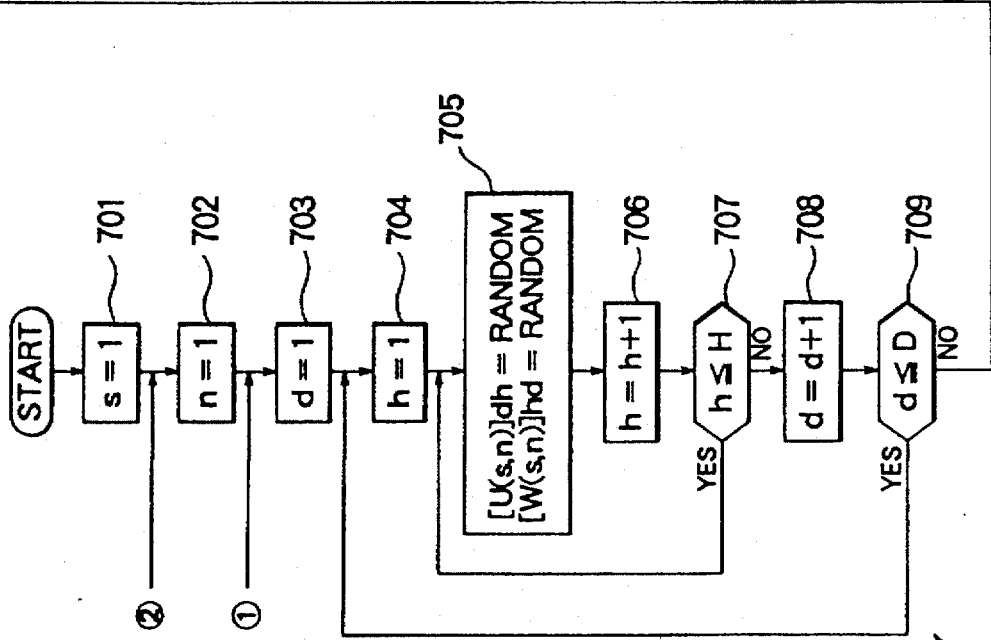

Turning to FIG. 7, the description will proceed to the initialization process in the step 201. It is assumed as follows. $[U(s, n)]_{dh}$ represents a parameter of d row and h column in the first coefficient matrix U(s, N) for the n-th predictor of the s-th reference pattern. $[V(s, n)]_{rh}$ represents a parameter of r row and h column in the second coefficient matrix V(s, n) for the n-th predictor of the s-th reference pattern. $[W(s, n)]_{hd}$ represents a parameter of h row and d column in the third coefficient matrix W(s, n) for the n-th predictor of the s-th reference pattern.

At first, all of the variables s, n, d, and h are initialized to one at steps 701, 702, 703 and 704. The step 704 is followed by a step 705 for setting random numbers in the parameters $[U(s, n)]_{dh}$ and $[W(s, n)]_{hd}$. The step 705 is succeeded by a step 706 where one is added to the variable h. The step 706 is followed by a step 707 for detecting whether or not the variable h is not greater than the predetermined number H. When the variable h is not greater than the predetermined number H, the step 707 turns back to the step 705. Otherwise, the step 707 proceeds to a step 708.

At the step 708, one is added to the variable d. The step 708 is followed by a step 709 for detecting whether or not the variable d is not greater than the a predetermined number D. When the variable d is not greater than the predetermined number D, the step 709 turns back to the step 704. Otherwise, the step 709 proceeds to a step 710.

At the step 710, a variable r is initialized to one. The step 710 is followed by a step 711 where the variable h is initialized to one. The step 711 is succeeded by a step 712 for setting a random number in the parameter $[V(s, n)]_{rh}$. The step 712 is succeeded by a step 713 where one is added to the variable h. The step 713 is followed by a step 714 for detecting whether or not the variable h is not greater than the predetermined number H. When the variable h is not greater than the predetermined number H, the step 714 turns back to the step 712. Otherwise, the step 714 proceeds to a step 715.

At the step 715, one is added to the variable r. The step 715 is followed by a step 716 for detecting whether or not the variable r is not greater than the predetermined number R. When the variable r is not greater than the predetermined number R, the step 716 turns back to the step 711. Otherwise, the step 716 proceeds to a step 717.

At the step 717, one is added to the variable n. The step 717 is succeeded by a step 718 for detecting whether or not the variable n is not greater than the third predetermined natural number Ns. When the variable n is not greater than the third predetermined natural number Ns, the step 718 turns back to the step 703. Otherwise, the step 718 is followed by a step 719.

At the step 719, one is added to the variable s. The step 719 is succeeded by a step 720 for detecting whether or not the variable s is not greater than the second predetermined natural number S. When the variable s is not greater than the second predetermined natural number S, the step 720 turns back to the step 702. Otherwise, processing of the initialization comes to an end.

Turning back to FIG. 4, at the step 202, the variable k for controlling repetition for training is initialized to one and processing between the steps 203 and 212 is repeatedly carried out K times, where K is a fifth predetermined natural number. At the step 203, the variable s, indicative of the reference pattern to be trained, is initialized to one and processing between the steps 204 and 210 is repeatedly carried out S times, where S is the second predetermined natural number, namely, the total number of the reference patterns. At the step 204, the variable m, indicative of the number of training data for the word s, is initialized to one and processing between steps 205 and 208 is repeatedly carried out Ms times, where Ms is the fourth predetermined natural number, namely, the total number of the training data. At the step 205, the correction amount δx is calculated on training the parameters X representing the reference pattern of the s-th word w(s) by using the m-th training speech pattern. At the step 206, the parameters X are corrected by the correction amount δx.

Figure 8A:
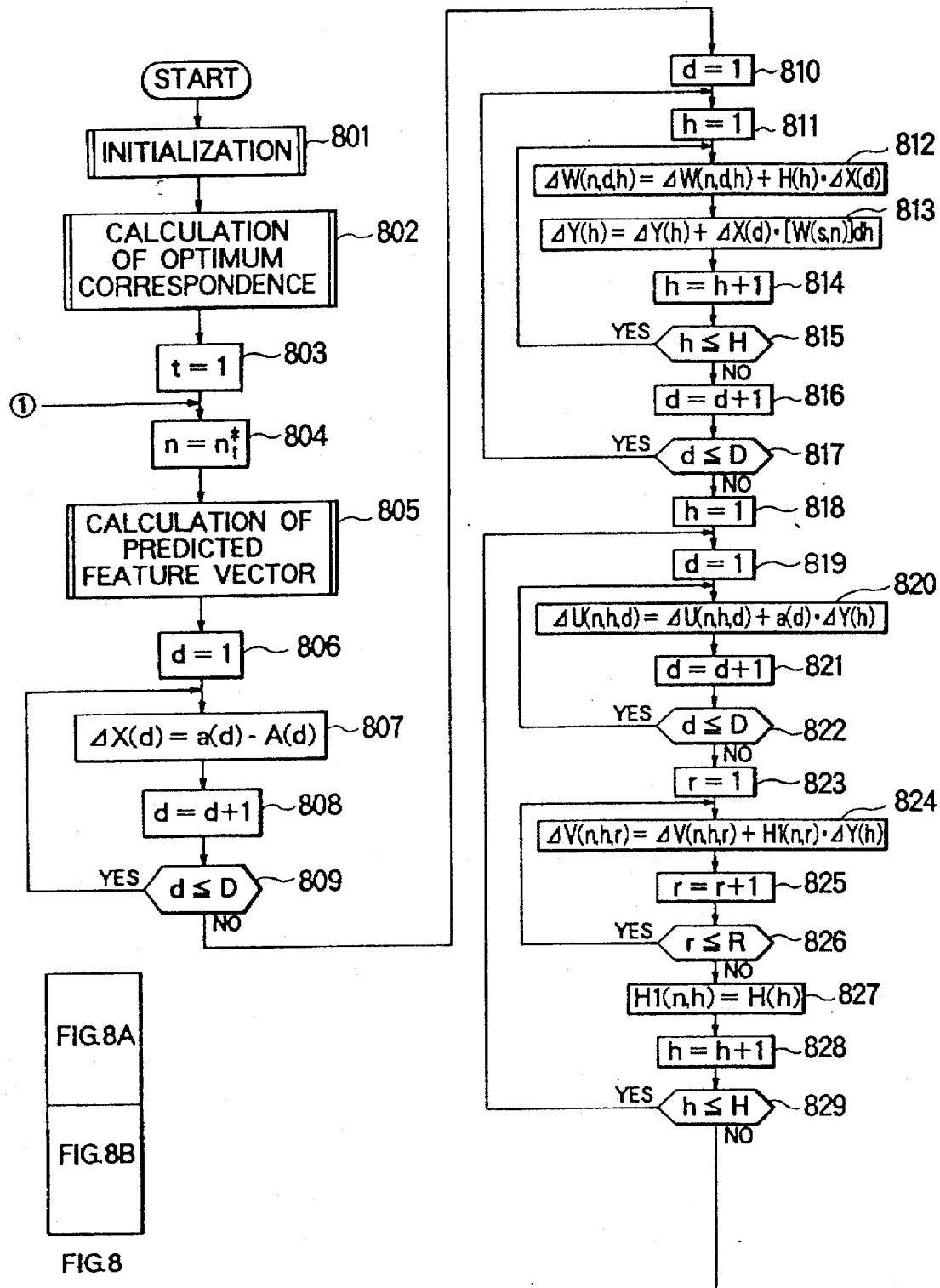
FIGS. 8(a) and (b) collectively show a flow chart for use in describing the operation of correction processing in steps illustrated in FIG. 4.
Figure 8B:
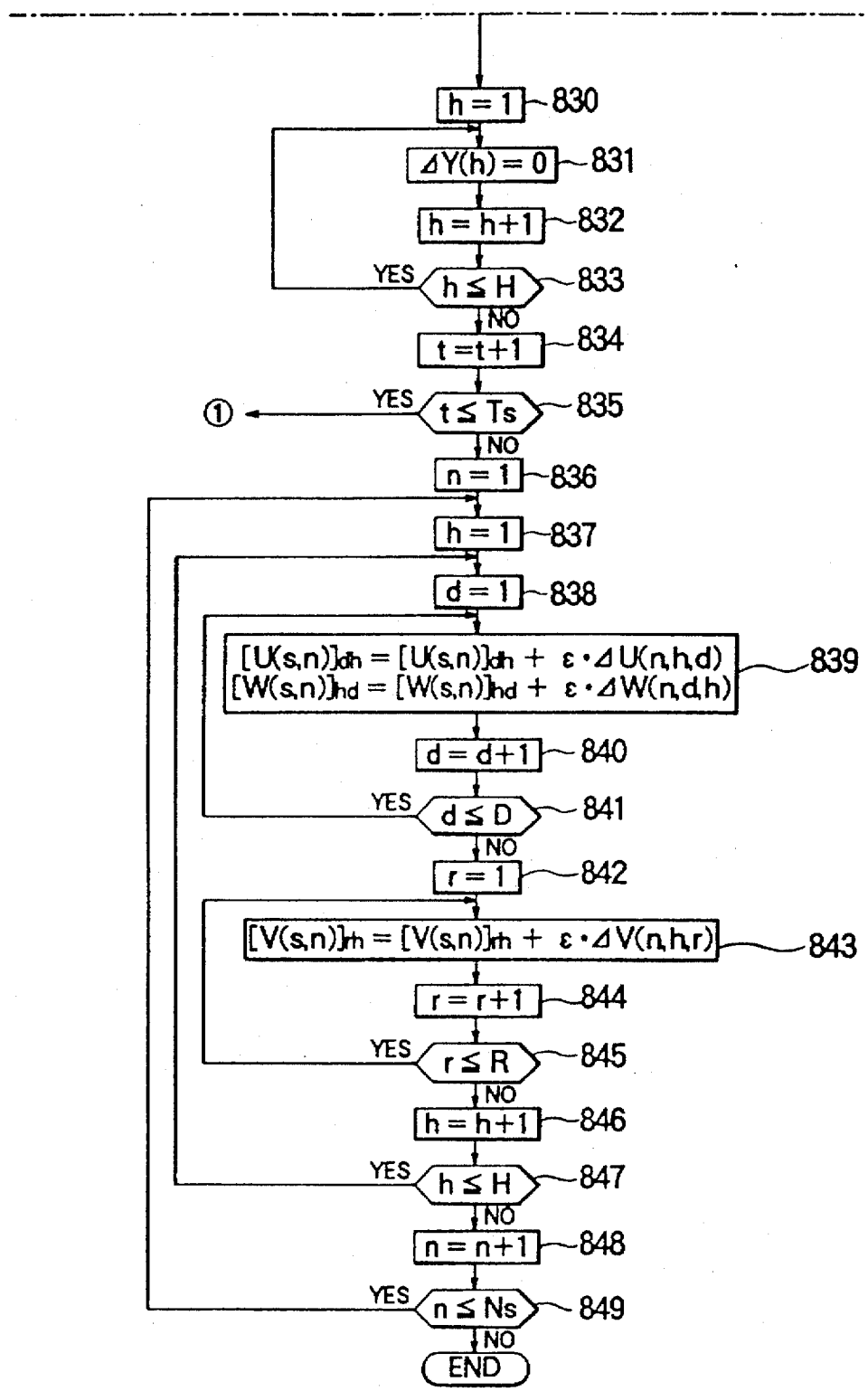

Turning to FIGS. 8(a) and (b), the description will proceed to the correction processing in steps 205 and 207. At first, a step 801 initializes variables necessary for training.

Figure 9:
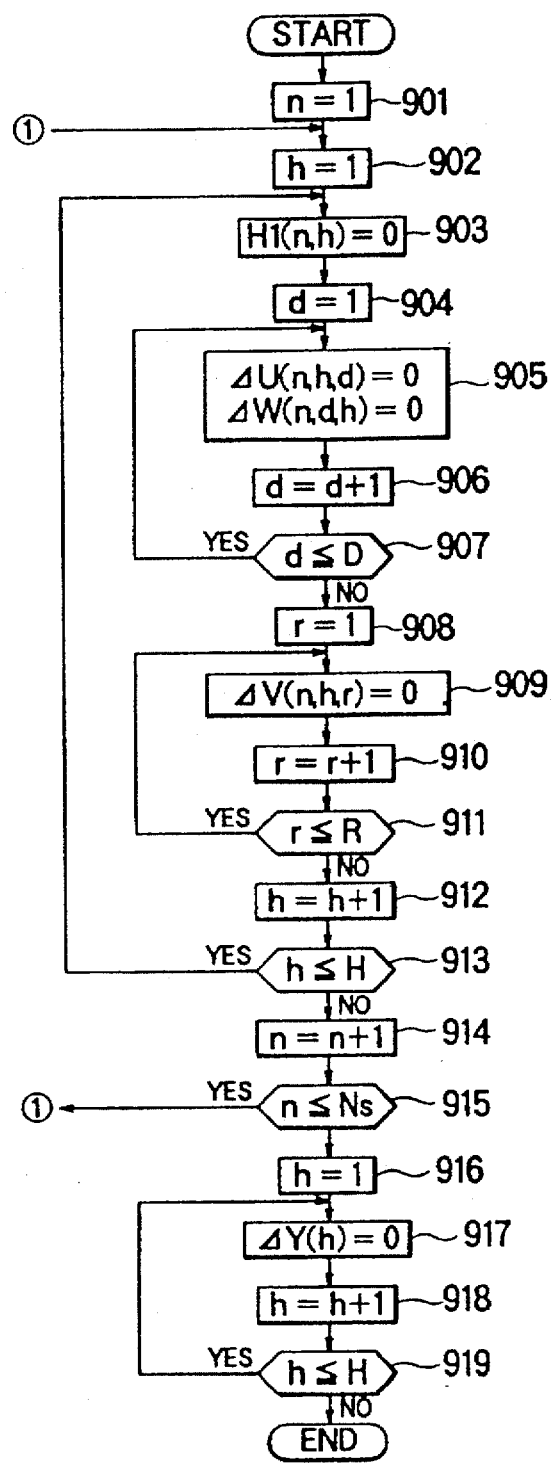
FIG. 9 shows a flow chart for use in describing the operation of an initialization process in a step illustrated in FIG. 8(a) and (b)

Turning to FIG. 9, the description will proceed to the initialization process in the step 801. At first, the variables n and h are initialized to one at steps 901 and 902. The step 902 is followed by a step 903 for setting zero in a variable H1(n, h). The step 903 is succeeded by a step 904 where the variable d is initialized to one. The step 904 proceeds to a step 905 for setting zero in variables ΔU(n, h, d) and ΔW(N, d, h). The step 905 is succeeded by a step 906 where one is added to the variable d. The step 906 is followed by a step 907 for detecting whether or not the variable d is not greater than the predetermined number D. When the variable d is not greater than the predetermined number D, the step 907 turns back to the step 905. Otherwise, the step 907 proceeds to a step 908.

At the step 908, the variable r is initialized to one. The step 908 is followed by a step 909 for setting zero in a variable ΔV(n, h, r). The step 909 is succeeded by a step 910 where one is added to the variable r. The step 910 is followed by a step 911 for detecting whether or not the variable r is not greater than the predetermined number R. When the variable r is not greater than the predetermined number R, the step 911 turns back to the step 909. Otherwise, the step 911 proceeds to a step 912 where one is added to the variable h. The step 912 is followed by a step 913 detecting whether or not the variable h is not greater than the predetermined number H. When the variable h is not greater than the predetermined number H, the step 913 turns back to the step 903. Otherwise, the step 913 proceeds to a step 914.

At step 914, one is added to the variable n. The step 914 is succeeded by a step 915 for detecting whether or not the variable n is not greater than the third predetermined natural number Ns. When the variable n is not greater than the third predetermined natural number Ns, the step 915 turns back to the step 902. Otherwise, the step 915 is followed by a step 916 where the variable h is initialized to one. The step 916 is succeeded by a step 917 for setting zero in a variable Y(h). The step 917 is succeeded by a step 918 where one is added to the variable h. The step 918 is followed by a step 919 for detecting whether or not the variable h is not greater than the predetermined number H. When the variable h is not greater than the predetermined number H, the step 918 turns back to the step 917. Otherwise, processing of the initialization comes to an end.

In FIGS. 8(a) and (b), the step 801 is followed by a step 802 for calculating an optimum correspondence between the s-th reference pattern and the m-th training speech pattern in a time axis.

Figure 10:
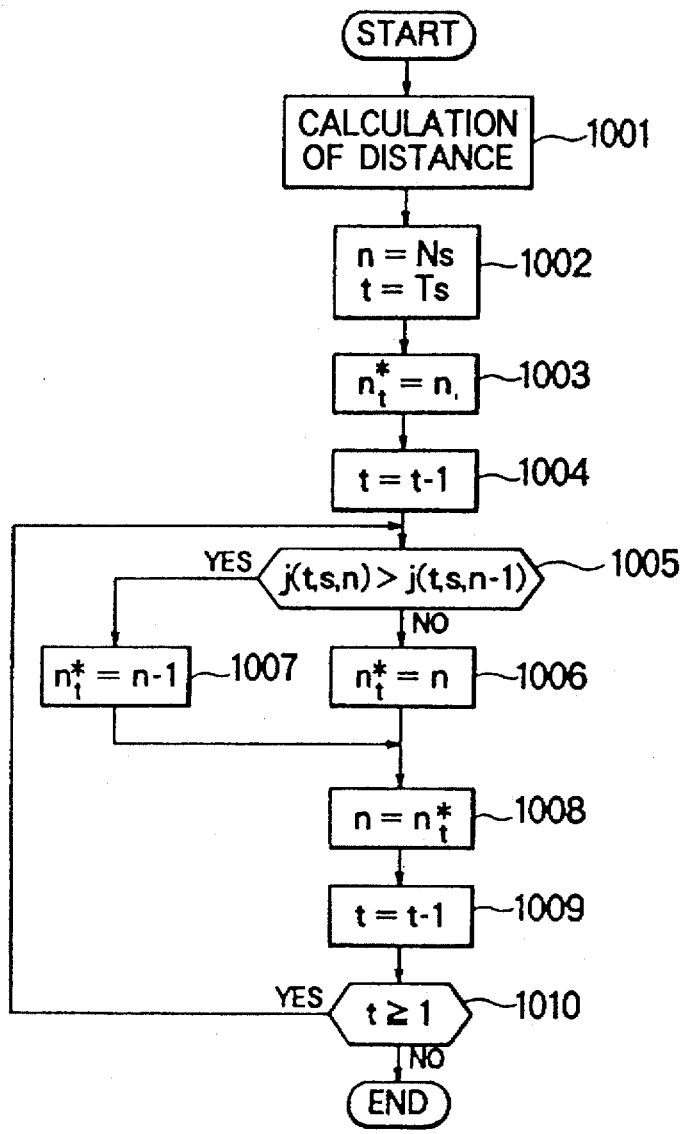
FIG. 10 shows a flow chart for use in describing the operation of calculation processing in a step illustrated in FIGS. 8(a) and (b).

Turning to FIG. 10, the description will proceed to the calculation processing in the step 802. At first, a step 1001 is for calculating a distance between the s-th reference pattern and the m-th training speech pattern in accordance with the equations (B1) to (B7). The step 1001 is followed by a step 1002. At the step 1002, into a variable n is substituted the number Ns of predictors for the m-th training speech data. In addition, into a variable t is substituted a temporal length Ts of the m-th training speech data. The step 1002 is succeeded by a step 1003 to substitute the variable n into a variable $n^*_t$ for holding the optimum correspondence in regard to the time axis. The step 1003 proceeds to a step 1004 where one is subtracted from the variable t. The step 1004 proceeds to a step 1005 for comparing the accumulated distance j(t, s, n) with the accumulated distance j(t, s, n−1). When the accumulated distance j(t, s, n−1), the step 1005 is followed by a step 1006 to substitute the variable n into the variable $n^*_t$. Otherwise, the step 1005 is succeeded by a step 1007 to substitute the variable n minus one to the variable $n^*_t$. Both of the steps 1006 and 1007 are followed by a step 1008.

The step 1008 substitutes the variable $n^s_t$ into the variable n. The step 1008 proceeds to a step 1009 where one is subtracted from the variable t. The step 1009 is followed by a step 1010 for detecting whether or not the variable t is not less than one. When the variable t is not less than one, the step 1010 turns back to the step 1005. Otherwise, processing of the calculation comes to an end. By repeatedly carrying out the steps 1005 to 1010, in all of the time instants t of the input speech, the number of the predictors is substituted into the variable $n^*_t$ with the optimum correspondence.

Turning back to FIGS. 8(a) and (b), the step 802 is followed by a step 803 where the variable t is initialized to be equal to one. The step 803 is succeeded by a step 804 to substitute the variable $n^*_t$ into the variable n. The step 804 proceeds to a step 805 for calculating the predicted feature vector by using the input feature vector of the input speech at the t-th time instant t and the n-th predictor. Processing of the step 805 is carried out in accordance with the equations (B1) and (B2). The step 805 is followed by a step 806 where the variable d is initialized to be equal to one. The step 806 is succeeded by a step 807 to substitute a difference between a d-th component of the input feature vector of the input speech at the t-th time instant t and a d-th component of the predicted feature vector calculated by the step 805 into the variable X(d). The step 807 is succeeded by a step 808 where one is added to the variable d. The step 808 is followed by a step 809 for detecting whether or not the variable d is not greater than the predetermined number D. When the variable d is not greater than the predetermined number D, the step 809 turns back to the step 807. Otherwise, the step 809 proceeds to a step 810.

At the step 810, the variable d is initialized to be equal to one. The step 810 is followed by a step 811 where the variable h is initialized to be equal to one. The step 811 is succeeded by a step 812 where a value H(h)·ΔX(d) is added to the variable ΔW(n, d, h), where H(h) represents an h-th component of the state vector calculated by the step 805. The step 812 proceeds to a step 813 where a value ΔX(d)·[W(s, n)]$_{dh}$ is added to the variable ΔY(h). The step 813 is followed by a step 814 where one is added to the variable h. The step 814 is followed by a step 815 for detecting whether or not the variable h is not greater than the predetermined number H. When the variable h is not greater than the predetermined number H, the step 815 turns back to the step 812. Otherwise, the step 815 proceeds to a step 816 where one is added to the variable d. The step 816 is followed by a step 817 for detecting whether or not the variable d is not greater than the predetermined number D. When the variable d is not greater than the predetermined number D, the step 817 turns back to the step 811. Otherwise, the step 817 proceeds to a step 818.

At the step 818, the variable h is initialized to be equal to one. The step 818 is followed by a step 819 where the variable d is initialized to be equal to one. The step 819 is succeeded by a step 820 where a value a(d)·ΔY(h) is added to the variable ΔU(n, h, d). The step 820 is followed by a step 821 where one is added to the variable d. The step 821 is followed by a step 822 for detecting whether or not the variable d is not greater than the predetermined number D. When the variable d is not greater than the predetermined number D, the step 822 turns back to the step 820. Otherwise, the step 822 proceeds to a step 823 where the variable r is initialized to be equal to one. The step 823 is succeeded by a step 824 where a value H1(n, r)·ΔY(h) is added to the variable ΔV(n, h. r). The step 824 is followed by a step 825 where one is added to the variable r. The step 825 is followed by a step 826 for detecting whether or not the variable r is not greater than the predetermined number R. When the variable r is not greater than the predetermined number R, the step 826 turns back to the step 824. Otherwise, the step 826 proceeds to a step 827 to substitute the variable H(h) into the variable H1(m, h). The step 827 is followed by a step 828 where one is added to the variable h. The step 828 is succeeded by a step 829 for detecting whether or not the variable h is not greater than the predetermined number H. When the variable h is not greater than the predetermined number H, the step 829 turns back to the step 819. Otherwise, the step 829 proceeds to a step 830.

At the step 830, the variable h is initialized to one. The step 830 is succeeded by a step 831 for setting zero in the variable ΔY(h). The step 831 is succeeded by a step 832 where one is added to the variable h. The step 832 is followed by a step 833 for detecting whether or not the variable h is not greater than the predetermined number H. When the variable h is not greater that the predetermined number H, the step 833 turns back to the step 831. Otherwise, the step 833 proceeds to a step 834 where one is added to the variable t. The step 834 is followed by a step 835 for detecting whether or not the variable t is not greater than the predetermined number Ts. When the variable t is not greater than the predetermined number Ts, the step 835 turns back to the step 804. Otherwise, the step 835 proceeds to a step 836.

At the step 836, the variable n is initialized to one. The step 836 is followed by a step 837 where the variable h is initialized to one. The step 837 is succeeded by a step 838 where the variable d is initialized to one. The step 838 is followed by a step 839 where a value $\epsilon \cdot \Delta U(n, h, d)$ is added to the parameter $[U(s, n)]_{d h}$ and another value $\epsilon \cdot \Delta W(n, d, h)$ is added to the parameter $[W(s, n)]_{hd}$. The step 839 proceeds to a step 840 where one is added to the variable d. The step 840 is followed by a step 841 for detecting whether or not the variable d is not greater than the predetermined number D. When the variable d is not greater than the predetermined number D, the step 841 turns back to the step 839. Otherwise, the step 841 proceeds to a step 842.

At the step 842, a variable r is initialized to one. The step 842 is succeeded by a step 843 where a value $\epsilon \cdot \Delta V(n, h, r)$ is added to the parameter $[V(s, n)]_{rh}$. The step 843 proceeds to a step 844 where one is added to the variable r. The step 844 is followed by a step 845 for detecting whether or not the variable r is not greater than the predetermined number R. When the variable r is not greater than the predetermined number R, the step 845 turns back to the step 843. Otherwise, the step 845 proceeds to a step 846 where one is added to the variable h. The step 846 is succeeded by a step 847 for detecting whether or not the variable h is not greater than the predetermined number H. When the variable h is not greater than the predetermined number H, the step 847 turns back to the step 838. Otherwise, the step 847 is followed by a step 848 where one is added to the variable n. The step 848 is succeeded by a step 849 for detecting whether or not the variable n is not greater than the third predetermined natural number Ns. When the variable n is not greater than the third predetermined natural number Ns, the step 849 turns back to the step 837. Otherwise, processing of the correction comes to an end. By repeatedly carrying out the steps 803 to 835, the correction amount for correcting the parameter of the predictor in the s-th reference pattern is calculated. By carrying out the steps 836 to 849, the correction amount is added to the parameter.

What is claimed is:

1. A method of training a plurality of predictors defining a reference pattern representative of a category by using a plurality of training patterns, each representing said category, to adjust a plurality of parameters characterizing each of said predictors, each of said predictors comprising an input layer, a hidden layer, and an output layer, the input layer comprising a plurality of primary input units and a plurality of secondary input units, the hidden layer comprising a plurality of hidden units, the output layer comprising a plurality of output units, each of said training patterns representing speech sound having a variable time interval, said method training said predictors with the aid of a computer system and comprising the steps of:

a. storing, in a reference pattern storing section, said parameters of the reference pattern, said parameters corresponding to a first coefficient matrix $U(s, n)$ for connecting between the primary input units and the hidden units, a second coefficient matrix $V(s, n)$ for connecting between the secondary input units and the hidden units, and a third coefficient matrix $W(s, n)$ for connecting between the hidden units and the output units, where $U(s, n)$ represents a matrix with D rows and H columns, $V(s, n)$ represents a matrix with R rows and H columns, $W(s, n)$ represents a matrix with H rows and D columns, and D, R, and H have dimensions of the feature vector, dimensions of the state vector, and the number of the hidden units, respectively;

b. storing, in a training speech data base storing section, training speech data of all categories to be recognition objects, said training speech data representing said training patterns each being time sequences of feature vectors into which the speech sound has been converted by an acoustic analysis section;

c. initializing, in a reference pattern correcting section, said parameters;

d. calculating, in said reference pattern correcting section, a prediction error between said reference pattern and one of said training patterns at a time;

e. correcting, in said reference pattern correcting section, said parameters so as to decrease said prediction error; and f. iterating, in said reference pattern correcting section, steps d and e for all of said training patterns.

2. A method of training a plurality of predictors defining a reference pattern representative of a reference category by using a plurality of training patterns, each representing a training category different from said reference category, to adjust a plurality of parameters characterizing each of said predictors, each of said predictors comprising an input layer, a hidden layer, and an output layer, the input layer comprising a plurality of primary input units and a plurality of secondary input units, the hidden layer comprising a plurality of hidden units, the output layer comprising a plurality of output units, each of said training patterns representing speech sound having a variable time interval, said method training said predictors with the aid of a computing system and comprising the steps of:

a. storing, in a reference pattern storing section, said parameters of the reference pattern, said parameters corresponding to a first coefficient matrix $U(s, n)$ for connecting between the primary input units and the hidden units, a second coefficient matrix $V(s, n)$ for connecting between the secondary input units and the hidden units, and a third coefficient matrix $W(s, n)$ for connecting between the hidden units and the output units, where $U(s, n)$ represents a matrix with D rows and H columns, $V(s, n)$ represents a matrix with R rows and H columns, $W(s, n)$ represents a matrix with H rows and D columns, and D, R and H have dimensions of the feature vector, dimensions of the state vector, and the number of the hidden units, respectively;

b. storing, in a training speech data base storing section, training speech data of all categories to be recognition objects, said training speech data representing said training patterns each being time sequences of feature vectors into which the speech sound has been converted by an acoustic analysis section;

c. initializing, in a reference pattern correcting section, said parameters;

d. calculating, in said reference pattern correcting section, a prediction error between said reference pattern and one of said training patterns at a time;

e. correcting, in said reference pattern correcting section, said parameters so as to increase said prediction error; and f. iterating, in said reference pattern correcting section, steps d and e for all of said training patterns.

* * * * *